United States Patent
Xi et al.

(10) Patent No.: US 11,041,795 B2
(45) Date of Patent: Jun. 22, 2021

(54) REFLECTIVE LASER-BASED PARTICLE DETECTOR

(71) Applicant: JEFFERSON SCIENCE ASSOCIATES, LLC, Newport News, VA (US)

(72) Inventors: Wenze Xi, Ellicott City, MD (US); Rongli Geng, Yorktown, VA (US); Carl Zorn, Yorktown, VA (US); Brian J. Kross, Yorktown, VA (US); Andrew G. Weisenberger, Yorktown, VA (US); Jack McKisson, Williamsburg, VA (US); John McKisson, Newport News, VA (US)

(73) Assignee: JEFFERSON SCIENCE ASSOCIATES, LLC, Newport News, VA (US)

(*) Notice: Subject to any disclaimer, the term of this patent is extended or adjusted under 35 U.S.C. 154(b) by 0 days.

(21) Appl. No.: 16/657,295

(22) Filed: Oct. 18, 2019

(65) Prior Publication Data
US 2021/0116348 A1    Apr. 22, 2021

(51) Int. Cl.
*G01N 15/02* (2006.01)
(52) U.S. Cl.
CPC .................. *G01N 15/0211* (2013.01)
(58) Field of Classification Search
CPC .......... G01B 9/02092; G01N 15/0227; G01N 15/429; G01N 15/434; G01N 15/1427; G01N 15/1459; G01N 15/1431; G01N 2015/1454; G01N 21/49; G01S 7/4916
USPC .......................... 356/335–343, 477, 432–440
See application file for complete search history.

(56) References Cited

U.S. PATENT DOCUMENTS

| | | | | |
|---|---|---|---|---|
| 6,530,286 B1* | 3/2003 | Carver | .................. | G01F 1/7084 356/28 |
| 6,859,419 B1* | 2/2005 | Blackmon | .............. | H04B 11/00 367/134 |
| 7,974,182 B2* | 7/2011 | Healey | ............... | G01D 5/35303 370/215 |
| 2005/0179896 A1* | 8/2005 | Girvin | ................ | G01N 15/1459 356/335 |
| 2011/0245714 A1* | 10/2011 | Volckaerts | ......... | A61N 1/36039 600/559 |
| 2012/0019834 A1* | 1/2012 | Bornhop | ................ | G01N 21/45 356/517 |

* cited by examiner

*Primary Examiner* — Hoa Q Pham

(57) ABSTRACT

A reflective laser-based particle detector for detecting contamination particles moving through a vacuum. Laser light is directed through a vacuum access window in the containment vessel and toward a reflective surface on an inner surface opposite the window. A photonic detector is positioned to monitor reflected laser from the opposite inner surface inside the vessel and is capable of detecting perturbations of the reflected light. The system makes use of optical interferometry techniques embodied as a photonic integrated circuit to detect the particles. The reflective laser-based system can be placed entirely outside the vacuum thereby avoiding the need for breaking the vacuum environment to check for accumulation of contaminant particles.

12 Claims, 2 Drawing Sheets

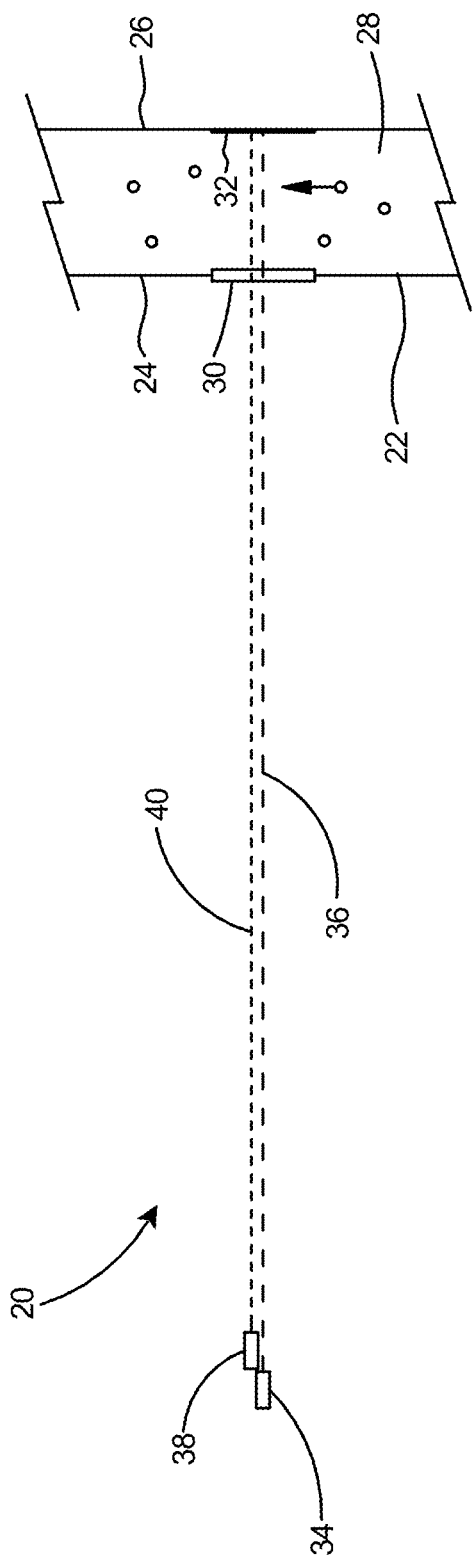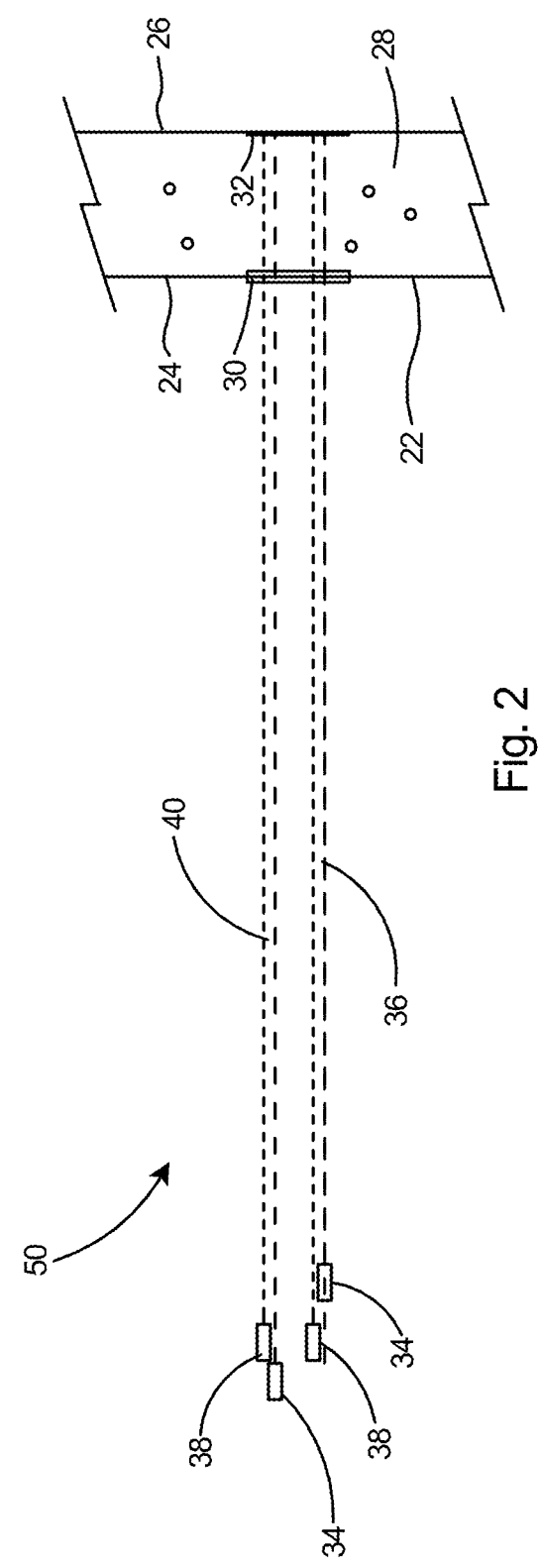

REFLECTIVE LASER-BASED PARTICLE DETECTOR

The United States Government may have certain rights to this invention under Management and Operating Contract No. DE-AC05-06OR23177 from the Department of Energy.

FIELD OF THE INVENTION

The present invention relates to particle detection devices and more particularly an optical system for detecting contamination particles in a vacuum system.

BACKGROUND

The Thomas Jefferson National Accelerator Facility, located in Newport News, Va. conducts experiments for discovering the fundamental structure of nuclear matter. The main research facility is the Continuous Electron Beam Accelerator Facility (CEBAF) accelerator, which consists of a polarized electron source, an injector, and a pair of superconducting RF linear accelerators that are connected to each other by two arc sections having steering magnets therein. The CEBAF accelerator includes a series of segmented cryomodules which use liquid helium to cool a series of niobium superconducting Radio Frequency (SRF) cavities to approximately 2 K and accelerate the electrons substantially to the speed of light.

After the recent 12 GeV upgrade of the CEBAF superconducting accelerator, particulates have been observed on the surfaces of ultra-high vacuum (UHV) beam-line components. The contamination included micrometer-sized particles in the accelerator vacuum electron beam line. The contaminant species were comprised mainly of metallic particles. Evidence pointed particularly to long distance transportation of titanium and tantalum particulates by ion pumps in the vacuum system. Unfortunately, the contamination can cause field effects in the accelerator cavities and interfere with their performance. Another problem is that the contaminants can only be observed after shutdown and disassembly of the accelerator, which causes loss of operating time.

Accordingly, there is a need to reduce or eliminate the contamination of particle accelerators by ion pumps and other devices such as gate valves. A further purpose of the present invention is to provide a system that can monitor the amount of contamination while the accelerator is operating.

Objects and Advantages of the Invention

The object of the present invention is to provide a system for monitoring for contaminants and their movements within the beam line of the accelerator while the accelerator is operating.

A further objective is to provide an accelerator contaminate monitoring system that is remote from the accelerator.

Another objective is to provide an accelerator contaminate monitoring system that may be mounted outside of the radiation field surrounding the accelerator.

A further objective is to provide an optical contaminate monitoring device that can be placed outside a vacuum system.

Another objective is to provide a monitoring device that is capable of detecting contamination particles moving through a vacuum.

These and other objects and advantages of the present invention will be understood by reading the following description along with reference to the drawings.

SUMMARY OF THE INVENTION

The present invention is a reflective laser-based particle detector for detecting contamination particles moving through a vacuum in a containment vessel. Laser light is directed through a vacuum access window in the containment vessel and toward a specular reflective surface on an inner surface opposite the window. A photonic sensor is positioned to monitor reflected laser from the opposite inner surface inside the vessel and is capable of detecting perturbations of the reflected light. Each channel of the sensor splits the initial laser light into two components: one is launched toward the remote specularly reflective surface and the other portion is contained inside the sensor, and acts as the reference beam. The reflected laser beam returns along the same path as the launched beam. It overlaps with the reference laser beam forming a final signal beam that is amplified and also contains an interference component. This interference component provides information on both the intensity change of the signal beam and the phase difference between both the signal beam and reference beam. When a moving particle intersects with the original launched laser beam, part of laser beam is scattered and reflected back to the sensor and part of the initial laser beam is obscured. The internal sensor detects both the amplitude and phase change in the interference component of the final signal beam. This information is interpreted appropriately to indicate the presence of small particles in the beam path. The reflective laser-based system can be placed entirely outside the vacuum thereby avoiding the need for breaking the vacuum environment to check for accumulation of contaminant particles.

BRIEF DESCRIPTION OF THE SEVERAL VIEWS OF THE DRAWING(S)

Reference is made herein to the accompanying drawings, which are not necessarily drawn to scale, and wherein:

FIG. 1 depicts a reflective laser-based particle detector with a laser beam directed through a single optical access window for detecting contamination particles in motion within a vacuum.

FIG. 2 depicts a second embodiment of the reflective laser-based particle detector including a multiplicity of laser beams in a coplanar array that are arranged to enlarge the sensing volume.

DETAILED DESCRIPTION

Figure 3:
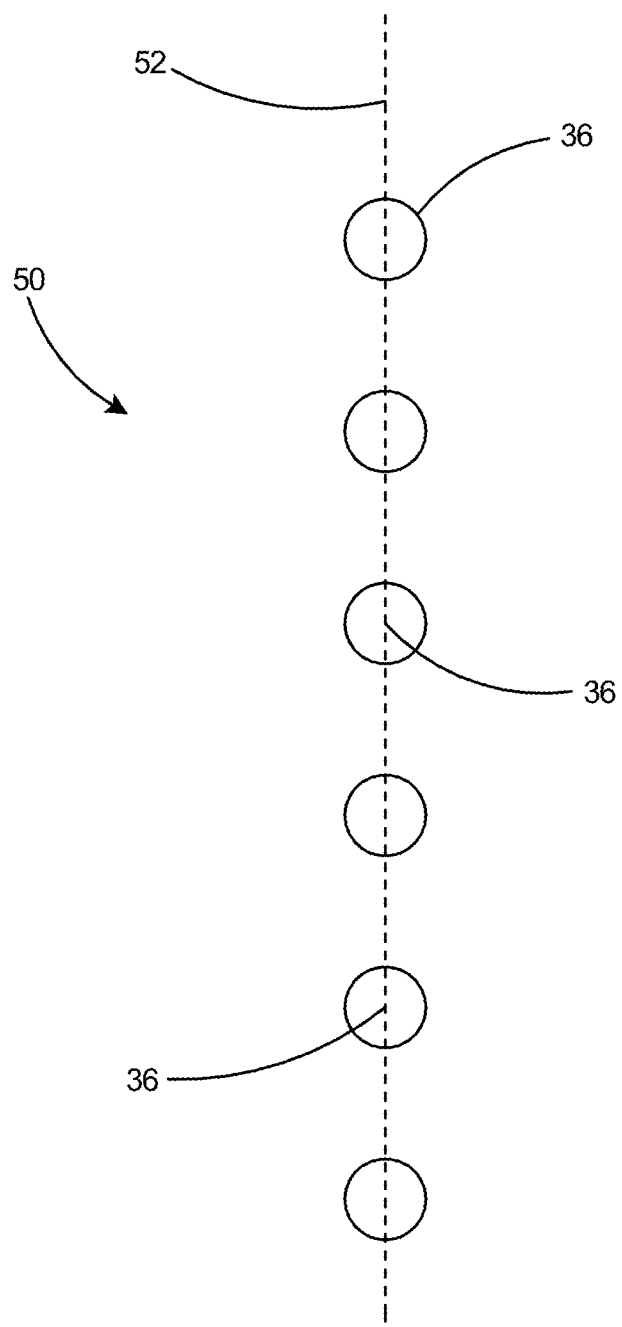
FIG. 3 depicts a sectional view taken through a plurality of laser beams in a coplanar array according to the second embodiment of the reflective laser-based particle detector.

The present invention is a reflective laser-based particle detector for detecting contamination particles flying across a volume of interest. In one embodiment the volume of interest is a vacuum, with the present invention having the advantage that the reflective laser-based particle detector can be placed outside the vacuum. In this embodiment the concept involves installation of a vacuum access window in the beam-line, shooting laser light through the vacuum access window, and using forward and backward laser light, wherein the backward light originates from the reflection of the forward laser light off of the collecting the light reflected from the opposite inner surface inside the beam line. The system makes use of optical interferometry techniques embodied as a photonic integrated circuit to detect the particles.

The reflective laser-based particle detector is capable of accessing the vacuum through a single optical access window. Laser transmission and reception devices are located at the same location optically collinear outside the vacuum access window. The sensitivity of an appropriate interferometric photonic integrated circuit allows the detection of minute perturbations and so enables the detection of charged/uncharged particles down to micron and sub-micron sizes as they pass through this sensing volume.

A second embodiment of the reflective laser-based particle detector includes a multiplicity of laser beams in a coplanar array that are arranged to increase the extent of the sensing region. Two or more parallel arrangements of these coplanar arrays of beams are positioned to allow determination of the direction and velocity of particles that pass through the sensing volume. The reflective laser-based particle detector overcomes the limitations of conventional vacuum particle sensors that include sensors positioned within the vacuum and that are based on the detection of scattered light. Because such a device can be instrumented totally outside the vacuum pipe, it avoids any installation challenges dealing with breaking a vacuum environment.

As opposed to conventional detection systems which rely on the light scattered away from the original beam path in the reflective laser-based particle detector of the present invention, a beam of laser light is projected across a sensing volume is reflected partially or completely back to a photonic detector. The system makes use of optical interferometry techniques embodied as a photonic integrated circuit to detect the particles.

The sensitivity of an appropriate photonic detection system allows the detection of minute perturbations and so enables the detection of charged and uncharged particles down to micron and sub-micron sizes as they pass through this sensing volume. The character of the output signals from the photonic detector system may be used to infer multiple characteristics of the particles, such as size and composition, which perturb the beam or beams.

It is important to note that no other instrumentation besides a reflector is required on the far side of the sensing volume, and that this reflector may be a partial, diffuse reflector without critical alignment requirements. Further, the light projection and reflections across the sensing volume may be accomplished through windows or other optical elements with only negligible decreases in the signal to noise and negligible impact on particle detectability.

The beam size and focus of the beam along the path limits the sensing volume for a single beam but a multiplicity of beams in a coplanar array may be arranged to enlarge the extent of the sensing region. Two or more parallel arrangements of these coplanar arrays of beams may be positioned to enable determination of the direction and velocity of particles that pass through the sensing volume.

The meaning of the term "Reflected Laser Particle Detection" (RLPD) as used herein refers to a system that utilizes reflected laser light to detect micron-size particulates suspended or traveling in a sensing volume.

The meaning of the term "sensing volume" as used herein refers to a region were particles pass through one or more laser light beam paths, disturbing those paths and thus being detected.

The meaning of the term "photonic detector" as used herein refers to an integrated circuit which is capable through interferometric techniques of measuring minute phase and/or intensity perturbations of a laser light source which is partially or substantially reflected back along its original path.

The meaning of the term "beam size" as used herein refers to the cross-section of a collimated or focused beam of laser light. The meaning of the term "coplanar beam array" as used herein refers to a series of nominally parallel laser light paths that are aligned in the same plane.

The new proposal involves a particle detection system using a plurality of laser lines in two separate parallel planes. The plenitude of laser lines would enhance the probability of detection and the use of two planes would allow the system to infer the direction of motion. In addition, the actual lasers and detection electronics could be kept well away from the high radiation area near the beam line. The large laser beam spot provides a high probability of detecting particles with a tradeoff in that larger beam spot decreases the signal to noise ratio.

Referring to FIG. 1, a reflective laser-based particle detector 20 for detecting contamination particles moving across a vacuum includes a vacuum containment device 22 including a near wall 24, a far wall 26, and a sensing volume 28. An optical access window 30 is provided in the near wall 24 of the vacuum containment device 22. The vacuum containment device 22 may include a reflective surface 32 on the inner surface of the far wall 26 opposite the optical access window 30. A laser 34, mounted outside the sensing volume, emits a laser beam 36. The laser beam 36 is directed through the optical access window 30 and onto the reflective surface 32 of the far wall. A photonic detector 38 is mounted outside the sensing volume. The photonic detector 34 detects perturbations of the reflected light 40.

With reference to FIG. 2, a second embodiment of the reflective laser-based particle detector 50 includes a plurality of lasers 34 each emitting a laser beam 36. The laser beams 36 are directed through an optical access window 30 and onto the reflective surface 32. The laser beams 36 are arranged parallel to one another and in a coplanar array. A photonic detector 38 is paired with each of the lasers 34. Each of the photonic detectors 38 detects perturbations of the reflected light 40 from the laser it is paired with.

Referring to FIG. 3 the second embodiment of the reflective laser-based particle detector includes a plurality of laser beams 36 in a coplanar array. The laser beams 36 are coplanar or arranged along a single plane 52.

The description of the reflective laser-based particle detectors herein above are described as detecting particles within a vacuum. It should be understood the particle detector can also be used to detect particles within any enclosed volume, either under vacuum, ambient, or under pressure. The system is described with a window to isolate the detection volume from the optics and electronics. It should be understood that in some cases a window may not be necessary. The system is also described with a reflective surface in the far wall. It should be understood that in some cases the interior surface of the containment device may be constructed with a reflecting surface, negating the need for installation of a reflective surface or any modification of the existing surface.

A bench top experiment using 20 micron tungsten wire and a beam spot of 0.5 mm provided evidence that a reflective laser-based particle detector using a multiplicity of laser beams in a coplanar array successfully and placed outside the vacuum could successfully detect particles traversing the interior of the evacuated beam-line with an acceptable signal to noise ratio. Preferably the beam spot size is 0.2 mm to 0.8 mm and most preferably the beam spot size is 0.5 mm. Experimental results indicate that the reflective laser-based particle detector is effective for detecting particles to 1 micrometer size in a vacuum.

The reflective laser-based particle detector further includes additional electronics to synchronize the multiple laser optics system and a computer processing system including algorithms to convert electronic data from the photonic detectors to information regarding the particle detection and, in the multiple laser embodiment, information regarding the direction of movement of the particles.

Possible applications of this technology include nuclear reactors, clean room particle analysis, any manufacturing process that requires a vacuum, such as integrated circuit production, or other situations that preclude exposure of optics or detector equipment to the environment of the sensing volume.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A reflective laser-based particle detector for detecting contamination particles within a volume comprising:
    a volume containment device including a near wall, a far wall, and a sensing volume;
    an optical access window in the near wall of the volume containment device;
    a reflective surface on the inner surface of the far wall opposite the optical access window;
    a laser emitting a laser beam, said laser beam directed through the optical access window and at the reflective surface to create a reflected beam returned through the volume and along the same path as the laser beam;
    a photonic detector for detecting perturbations of the reflected light; and
    the contamination particles detected include charged and uncharged particles.

2. The reflective laser-based particle detector of claim 1 wherein said laser comprises a beam spot size of 0.2 mm to 0.8 mm.

3. The reflective laser-based particle detector of claim 1 wherein said laser comprises a beam spot size of 0.5 mm.

4. The reflective laser-based particle detector of claim 1 comprising:
    a second laser emitting a second laser beam, said second laser beam directed through the optical access window and at the reflective surface; and
    a second photonic detector for detecting perturbations of the reflected light from the second laser beam.

5. The reflective laser-based particle detector of claim 4 comprising said second laser beam is parallel and coplanar with said first laser beam to enlarge the sensing volume.

6. The reflective laser-based particle detector of claim 1 wherein said volume is a vacuum.

7. A reflective laser-based particle detector for detecting contamination particles within a volume comprising:
    a volume containment device including a near wall, a far wall, and a sensing volume;
    an optical access window in the near wall of the volume containment device;
    a reflective surface on the inner surface of the far wall opposite the optical access window;
    a laser emitting a laser beam, said laser beam directed through the optical access window and at the reflective surface to create a reflected beam returned through the volume and along the same path as the laser beam;
    a photonic detector for detecting perturbations of the reflected light; and
    the contamination particles detected include micron and sub-micron sizes.

8. A reflective laser-based particle detector for detecting the direction and velocity of contamination particles within a volume comprising:
    a volume containment device including a near wall, a far wall, and a sensing volume;
    an optical access window in the near wall of the volume containment device;
    a reflective surface on the inner surface of the far wall opposite the optical access window;
    a plurality of lasers each emitting a laser beam, said laser beams directed through the optical access window and at the reflective surface to create a plurality of reflected beams returned through the volume and along the same path as the laser beams;
    said laser beams arranged parallel to one another and in a coplanar array;
    a photonic detector paired with each of said lasers, each of said photonic detectors detecting perturbations of the reflected light from the laser it is paired with; and
    the contamination particles detected include micron and sub-micron sizes.

9. The reflective laser-based particle detector of claim 8 wherein said lasers in said plurality of lasers each include a beam spot size of 0.2 mm to 0.8 mm.

10. The reflective laser-based particle detector of claim 8 wherein said lasers in said plurality of lasers each include a beam spot size of 0.5 mm.

11. The reflective laser-based particle detector of claim 8 wherein each of said lasers and photonic detectors is positioned outside the sensing volume.

12. The reflective laser-based particle detector of claim 8 wherein said volume is a vacuum.

* * * * *